United States Patent
Leyland (10) Patent No.: US 9,604,135 B2
(45) Date of Patent: Mar. 28, 2017

(54) VIDEO GAME SYSTEM AND TOY WITH RF ANTENNA

(71) Applicant: Activision Publishing, Inc., Santa Monica, CA (US)

(72) Inventor: Robert Leyland, Novato, CA (US)

(73) Assignee: Activision Publishing, Inc., Santa Monica, CA (US)

(*) Notice: Subject to any disclaimer, the term of this patent is extended or adjusted under 35 U.S.C. 154(b) by 0 days.

(21) Appl. No.: 14/719,126

(22) Filed: May 21, 2015

(65) Prior Publication Data

US 2016/0310839 A1  Oct. 27, 2016

Related U.S. Application Data

(60) Provisional application No. 62/151,328, filed on Apr. 22, 2015.

(51) Int. Cl.
| A63F 9/24 | (2006.01) |
| A63F 13/00 | (2014.01) |
| G06F 17/00 | (2006.01) |
| G06F 19/00 | (2011.01) |
| A63F 13/23 | (2014.01) |
| A63F 13/95 | (2014.01) |

(52) U.S. Cl.
CPC .............. *A63F 13/23* (2014.09); *A63F 13/95* (2014.09)

(58) Field of Classification Search
USPC .. 463/1, 20, 22, 25, 36, 37, 40, 42; 336/130
See application file for complete search history.

(56) References Cited

U.S. PATENT DOCUMENTS

| 7,488,231 | B2* | 2/2009 | Weston .......................... 446/175 |
| 7,896,742 | B2* | 3/2011 | Weston et al. ................... 463/37 |
| 2008/0061916 | A1* | 3/2008 | Pulskamp ............... H01F 21/06 336/130 |
| 2010/0105477 | A1* | 4/2010 | Chang et al. ................... 463/36 |
| 2014/0274373 | A1* | 9/2014 | Olshan .................... G06T 13/40 463/31 |

* cited by examiner

*Primary Examiner* — Adetokunbo O Torimiro
(74) *Attorney, Agent, or Firm* — Klein, O'Neill & Singh, LLP (57) ABSTRACT

A toy for a video game may include an RFID tag, with an inductive antenna for receiving and transmitting signals. The inductive antenna may have a ferromagnetic core. Inductance of the inductive antenna may be selected such that tuning of the antenna is determined by the inductance of the antenna and input capacitance of an RFID semiconductor circuit of the RFID tag, with in some embodiments no tuning capacitors utilized. In some embodiments the input capacitance of the RFID semiconductor circuit is parasitic capacitance of the RFID semiconductor circuit.

8 Claims, 6 Drawing Sheets

VIDEO GAME SYSTEM AND TOY WITH RF ANTENNA

CROSS REFERENCE TO RELATED APPLICATION

This application claims the benefit of the filing date of U.S. Provisional Patent Application No. 62/151,328, filed on Apr. 22, 2015, the disclosure of which is incorporated by reference herein.

BACKGROUND OF THE INVENTION

The present invention relates generally to video games, devices, and more particularly to RFID devices integrated in toys used in connection with a video game.

Video games provide a fun and enjoyable environment for many people. Video games allow game players to participate in a variety of simulated activities and also allow game players to perform roles and experience activities that the game players may not be able or desire to experience directly. In general, video games are being provided by way of an electronic device such as a game console and a display such as a television screen. However, video games often lack a physical component by which a game player may touch and hold a representative object associated with video game play or otherwise have a physical object representative of video game play. Merely interacting with a displayed simulated environment may not allow game players to fully relate to game play, with a sharply distinct separation between a game play world and the world physically occupied by the game players.

A physical component to video game play can be provided using a toy identifiable to the video game with for example information of a toy being provided to a video game device, or reader for a video game device, using wireless communications. Unfortunately, some forms of wireless communications may not be appropriate for use, for example due to cost, size, or other issues. Other forms of wireless communications may be useable in some forms, but may face power, bandwidth, reliability, or other issues.

BRIEF SUMMARY OF THE INVENTION

Some aspects of embodiments of the invention include a video game system, comprising: a toy including an inductor connected to a radio frequency identifier (RFID) integrated circuit, the RFID integrated circuit including memory to store information related to a video game character, the inductor and an input capacitance provided by the RFID integrated circuit forming a resonant circuit with a resonant frequency inversely proportional to a square root of inductance of the inductor and capacitance of the input capacitance provided by the RFID integrated circuit; a peripheral device including RFID reader circuitry and a resonant coupler, the RFID reader circuitry configured to transmit signals at a frequency about the resonant frequency of the resonant circuit of the toy, the resonant coupler having a resonant frequency about the resonant frequency of the resonant circuit of the toy; and a video game device coupled to the peripheral device, the video game device configured to command the peripheral to write the information related to the video game character to the toy, to read the information related to the video game character from the toy, and to provide for video game play in which a user controls the video game character.

Some aspects of embodiments of the invention include a toy for use in a video game system, comprising: a housing; a radio frequency identifier (RFID) circuit within the housing, the RFID circuit configured for operation about a desired radio frequency, the RFID circuit including memory for storing information related to a video game character; and an inductive antenna coupled to the RFID circuit, the inductive antenna consisting of an inductor with a ferromagnetic core, the inductor having an inductance such that a circuit formed by the inductor and an input capacitance of the RFID circuit resonates about the desired radio frequency.

These and other aspects of the invention are more fully comprehended upon review of this disclosure.

DETAILED DESCRIPTION

Figure 1:
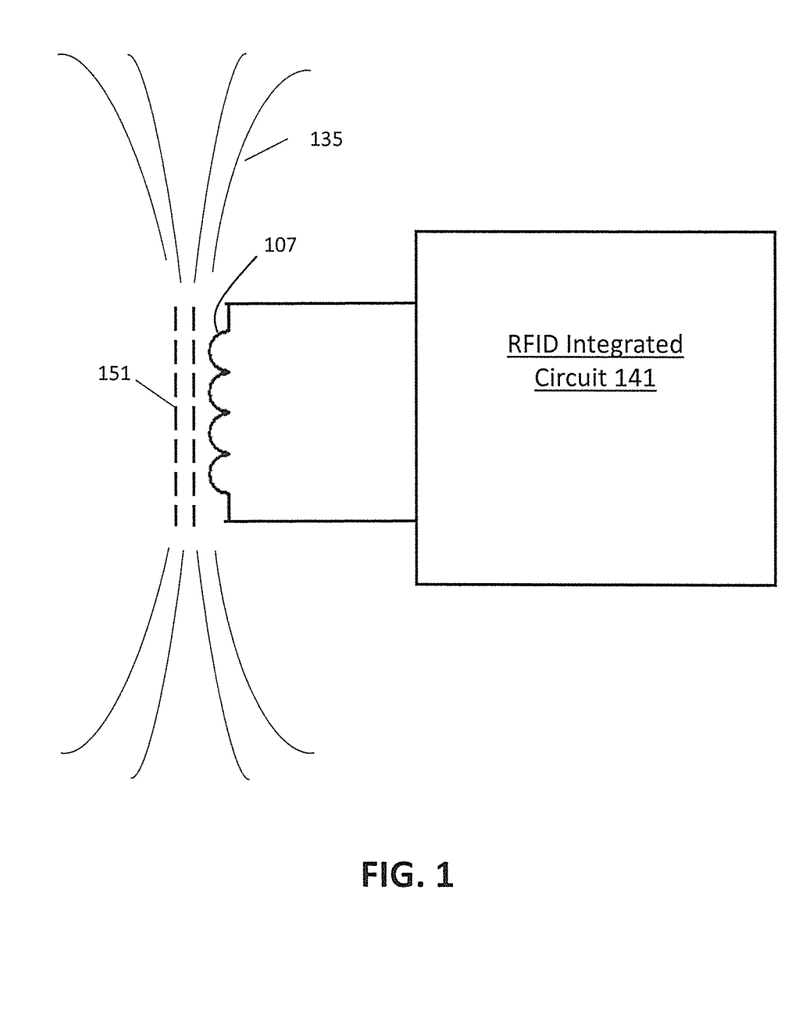
FIG. 1 is a semi-schematic, semi-block diagram of circuitry in accordance with aspects of the invention.

FIG. 1 is a semi-schematic, semi-block diagram of circuitry in accordance with aspects of the invention. In many embodiments the circuitry is included in a toy, for example a toy for use with a video game. The circuitry may be included in, for example, the toys of FIGS. 2, 3, and 6 discussed herein. As depicted in FIG. 1, the circuitry includes a radio-frequency identification (RFID) integrated circuit (IC) 141, an inductor 107 having ends coupled to I/O ports of the RFID IC, and a ferromagnetic core 151 in association with the inductor. In some embodiments the ends of the inductor are directly connected to the I/O ports of the RFID IC, with in various embodiments no other circuit elements external to the RFID IC coupled either in series or in parallel with the inductor. The RFID integrated circuit 141 serves to store and process information, modulate and demodulate radio-frequency signals or electromagnetic fields, and collect power from a proximate inductively coupled device.

The inductor 107, in many embodiments, is a metal wire wound into a coil. The inductor 107, for example, may be wound on or wrapped around the ferromagnetic core 151. In some embodiments the ferromagnetic core 151 may be a ferrite core, an iron core, and/or a silicon steel core.

The inductor and the internal RFID IC capacitance between the I/O ports form an LC circuit. The inductor has an inductance selected to tune or provide a resonant frequency for the LC circuit at a predetermined frequency. In some embodiments the internal RFID IC capacitance between the input ports is a parasitic capacitance. In some embodiments the predetermined frequency is 13.56 Mega-Hertz, the inductor has an inductance of 6.8 micro-Henrys, and the internal capacitance is 20 pico-Farads. In various embodiments, such an arrangement allows for a reduced number of components, and reduced cost, as a separate tuning capacitor may be omitted from the device.

In operation, varying magnetic fields, for example provided by an RFID reader, may generate currents in the inductor, providing both power and data signals to the RFID integrated circuit. The RFID integrated circuit may respond to such signals by providing its own signals to the inductor, effectively transmitting information to the RFID reader. Use of the ferromagnetic core may assist in direction of signals to the RFID reader, or to a resonant coupler associated with the RFID reader.

Figure 2:
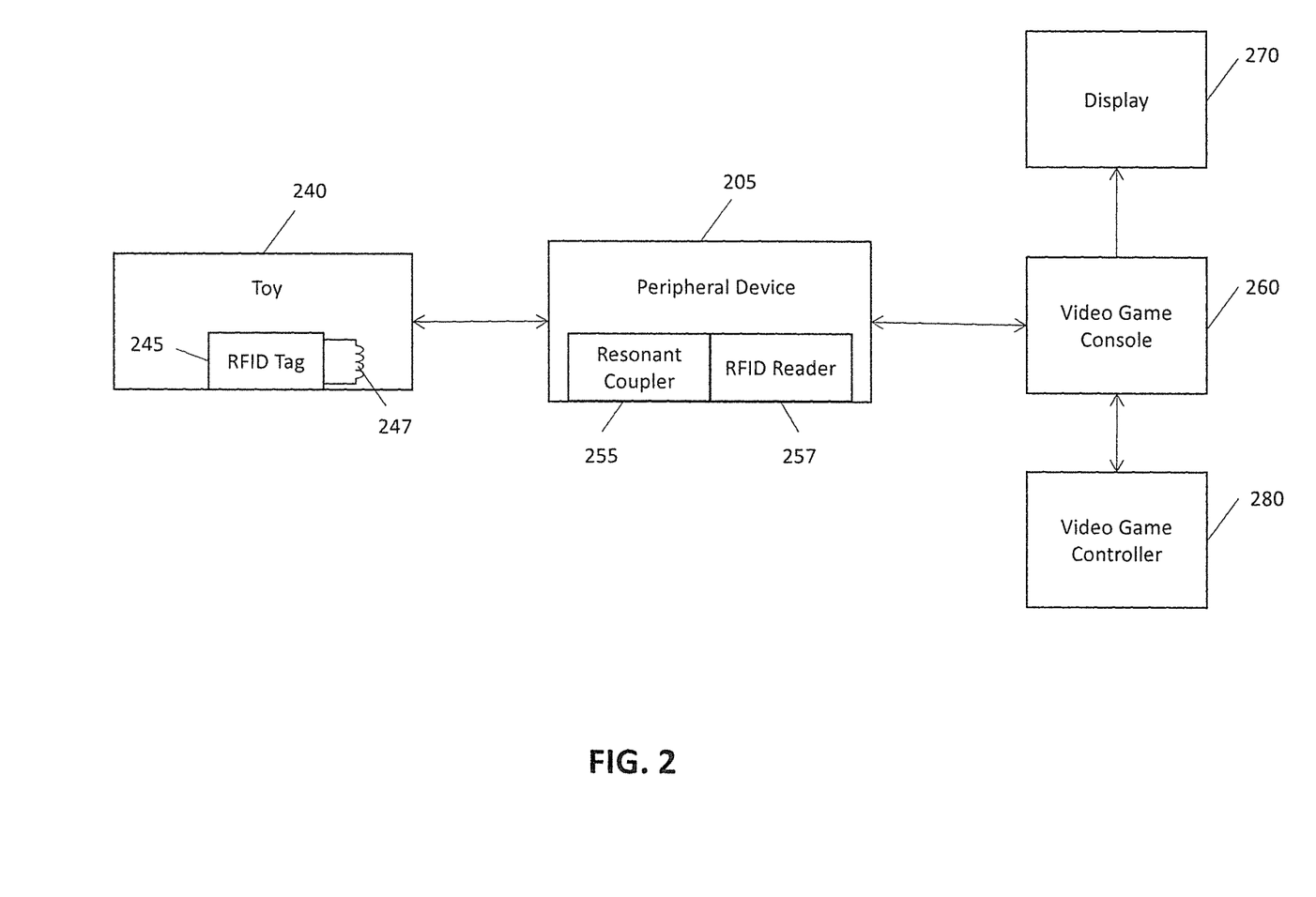
FIG. 2 is a block diagram of an example of a video game system in accordance with aspects of the invention.

FIG. 2 is a block diagram of an example of a video game system in accordance with aspects of the invention. The video game system includes a video game device, shown as a video game console in the embodiment of FIG. 2. In various embodiments, however, the video game device may be some other computer device, for example a personal computer, laptop, smartphone, tablet, or other computer device. The video game device includes at least one processor for executing program instructions providing for play of a video game associated circuitry, for example, for communicating with input and output devices, user input devices such as a game controller 280 providing user inputs, a display device 270 for displaying game play action, and a peripheral device 205. The peripheral device includes circuitry for communicating with a toy, for example toy 240.

The toy 240 generally provides a housing, with a radio frequency identification (RFID) tag 245 within the housing. In FIG. 2 an inductive antenna 247 is shown coupled to the RFID tag, although in various embodiments the inductive antenna may be considered part of the RFID tag. In various embodiments the inductive antenna 247 of the toy includes an inductor with a ferromagnetic core, which in some embodiments is a ferrite core. In some embodiments the inductive antenna includes a capacitor, to form an LC circuit (the LC circuit is generally tuned, by way of component selection, to have a resonant frequency at a communication frequency of a RFID reader of the peripheral, discussed below). In some embodiments, however, the inductive antenna does not include a capacitor, with instead capacitance for the LC circuit being provided by RFID tag. In some such embodiments the capacitance is provided by parasitic input capacitance of an RFID integrated circuit of the RFID tag, and in some embodiments the capacitance is provided solely by parasitic input capacitance of an RFID integrated circuit of the RFID tag.

The RFID tag stores data, for example, information of a character or a plurality of characters of the video game executed on the game device. In some embodiments, the information of the character is an identification of a character. In some embodiments, information of the character includes information as to the characteristics, for example capabilities, of the character. In some embodiments the toy may be in the shape of a character of the video game, or a weapon (e.g., a sword, shield, gun, cannon, bow and arrow, etc.) to be held by the character in the video game, or an item of clothing or some other accessory (e.g., hat, helmet, jacket, backpack, etc.) to be worn by the character, or some other shape.

The peripheral device 205, in some embodiments, includes a substantially flat upper surface for placement of one or more toys (e.g., toy 240) thereon. An RFID reader 257 includes an antenna positioned about the flat upper surface, for example under the flat upper surface, for communication with toys on the surface. In some embodiments, the peripheral device 205 may include a cavity for receiving at least part of the toy. The cavity in some embodiments is about an edge of the flat upper surface, and signal strength provided by the RFID reader antenna to and from toys at least partially in the cavity may not be sufficient for reliable communications. The peripheral therefore includes a resonant coupler 255 to strengthen signals passing between the toy and the RFID reader. In some embodiments the resonant coupler is positioned about the location of the cavity, so as to strengthen signals to or from the toy. In some embodiments the resonant coupler comprises an LC circuit. In some such embodiments the LC circuit has a resonant frequency about a communication frequency of the RFID reader, so as to increase strength of signals at that frequency.

The processor of the game console generally commands game play display on the display device 270 in response from the user input devices (e.g., the game controller 280). In some embodiments, the processor commands game play display of game characters in and interacting with a virtual world of game play and possibly each other. In addition, the processor, in response to inputs from the peripheral device 105, for example inputs based on information read from the toy 240, commands adding characters and objects to the virtual world, with the characters able to manipulate the added objects and move about the virtual world. For example, the processor may include characters in game play based on inputs from the peripheral device 205, and the processor may control actions and activities of game characters based on inputs from the user input devices (e.g., game controller 280). Furthermore, the processor, in response to inputs from the peripheral device 205, may be used to change the characteristics, powers, and/or attributes of characters and objects in the virtual world. For example, a character in game play may have one or more characteristics, powers, and/or attributes associated with it, such as health, strength, power, speed, wealth, shield, weapons, special abilities, spells, or achievement level, for example. The processor may alter one or more characteristics, powers, and/or attributes associated with a character in response to inputs from the peripheral device 205.

The program instructions providing for game play is generally stored on removable media such as an optical disk. Accordingly, the game console 180 may include an optical drive, for example, a DVD-ROM, CD-ROM or Blu-ray drive, for reading the program instructions for game play. In some embodiments, the removable media may be a flash memory data storage device, a hard disk, or a solid-state disk. In some embodiments, the game console 260 may be a personal computer that includes, for example, a built-in display and built-in user input devices such as a keyboard and a touch pad or mouse. In other embodiments, the program instructions providing for game play may be stored in a remote server that is accessed by a computer or mobile device. In yet other embodiments, the instructions providing for game play may be stored on the local memory of the game console.

In some embodiments the display device is integral to the game device, for example as may be the case if the game device is a smartphone or tablet. In other embodiments the display device may be physically separate from the game device, as illustrated in FIG. 2, which shows a game console and separate display device. The display device 270 is generally coupled to the game console 260 by a cable, although in some embodiments a wireless connection may be used. In some embodiments, audio and video contents are transferred from the game console 260 to the display device 270 using audio/video interfaces, for example, high-definition multimedia interface (HDMI), component video, and RCA connectors. In many embodiments, the display device 270 is a liquid crystal display (LCD). In some embodiments, the display device is a television. In some embodiments, the display device is a cathode ray display, a plasma display, an electroluminescent display, an LED or OLED display, or other display. A display screen of the display device 270 displays video images of game play, generally as commanded by the processor of the game console 260 or other associated circuitry of the game console.

Figure 3:
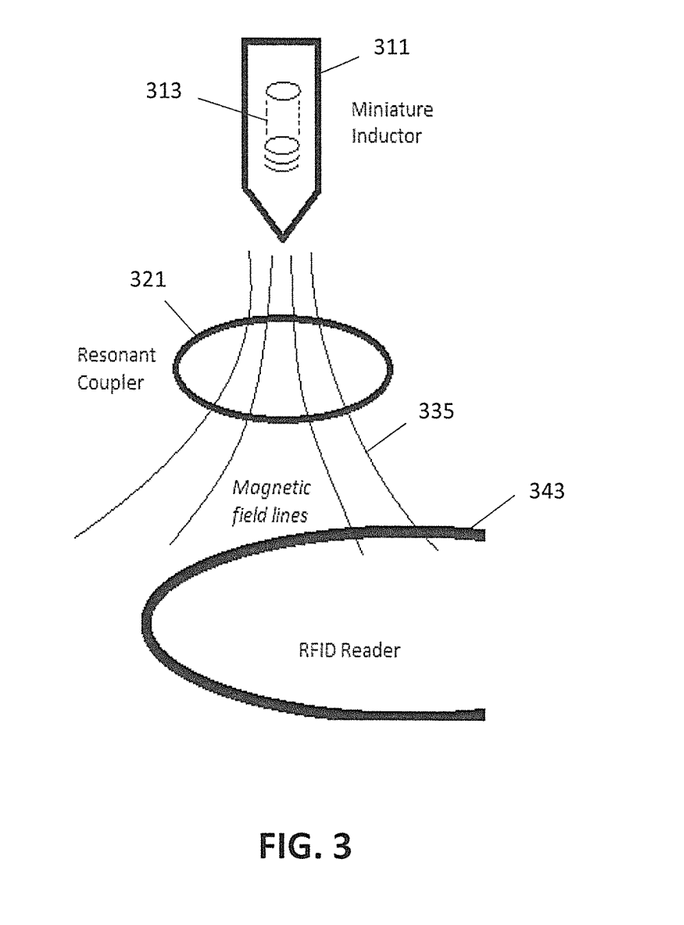
FIG. 3 illustrates aspects of a system in accordance with aspects of the invention.

FIG. 3 illustrates aspects of a system in accordance with aspects of the invention. In FIG. 3, a toy 311 includes an inductor 313. In some embodiments the toy is the toy of FIG. 2. The inductor is generally connected to RFID circuitry (not shown), which is generally in the form of integrated circuitry. The inductor 313 serves as an antenna for receiving and transmitting signals for the RFID circuitry. The RFID circuitry, or circuitry associated with the RFID circuitry, includes memory to store information relating to a game character of the video game. In some embodiments the information identifies the game character, and in some embodiments the information is the identity of the game character and information relating to various capabilities of the game character.

Information in the memory of or associated with the RFID circuitry may be read (and in some embodiments written) by an RFID reader, of which an inductive coil 343 is shown in FIG. 3. In the embodiment of FIG. 3, a resonant coupler 321 is also used, to increase strength of signals passed between the RFID toy and the RFID reader. The coil of the RFID reader and the resonant coupler may both be in a peripheral device, for example the peripheral device of FIG. 2 in some embodiments.

The resonant coupler 321 generally serves to couple an electromagnetic field (e.g., electromagnetic field 335) between the coil of the RFID reader and the inductor of the toy. In some embodiments, the resonant coupler 321 is the same as or similar to the resonant antenna extender or resonant coupler 255 of FIG. 2. In some embodiments, the resonant coupler 321 may include an inductor and a capacitance, often in the form of a capacitor, having a resonant frequency about a radio communication frequency of the RFID reader.

Figure 4:
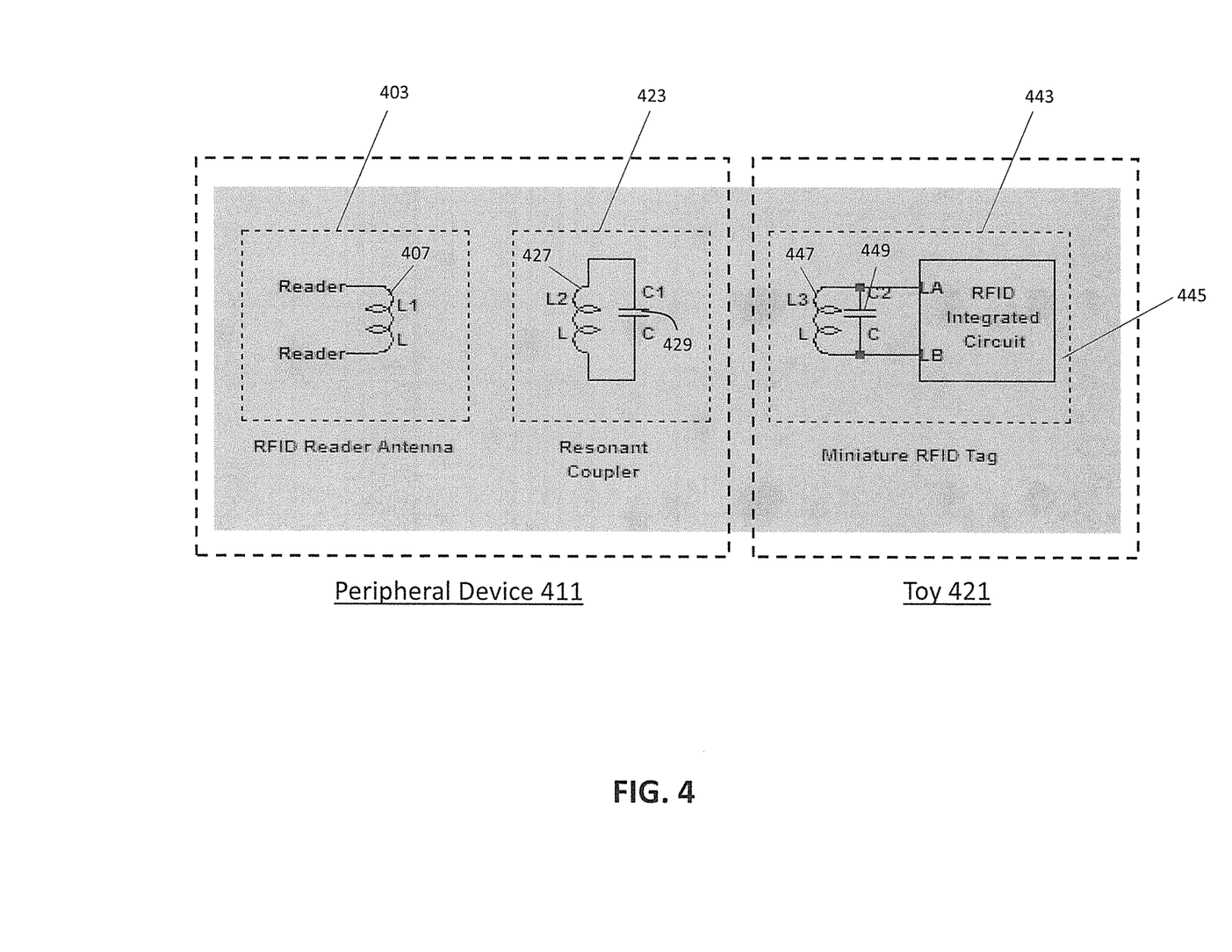
FIG. 4 is a semi-schematic, semi-block diagram of portions of a peripheral device 311 and toy 321 in accordance with aspects of the invention.

FIG. 4 is a semi-schematic, semi-block diagram of portions of a peripheral device 411 and toy 421 in accordance with aspects of the invention. In some embodiments, the portions of the peripheral may be portions of the peripheral device of FIG. 2. Similarly, in some embodiments the portions of the toy may be portions of the toy of FIG. 2.

The peripheral device includes an RFID reader, including a reader RFID antenna 403. The RFID antenna includes an inductor 407. Generally the RFID reader is configured for communications about a desired frequency, and the inductor 307 of the RFID antenna may have an inductance selected such that an LC circuit formed using the inductor has a resonant frequency about the desired frequency.

The peripheral device also includes a resonant coupler 423. The resonant coupler includes an inductor 427 and a capacitor 429, forming another LC circuit. Inductance of the inductor 427 and capacitance of the capacitor 429 are in most embodiments selected such that the LC circuit of the resonant coupler has a resonant frequency about the communication frequency of the RFID reader.

The toy 421 includes an RFID tag 443, having an RFID integrated circuit 445 and an antenna formed of an inductor 447 and a capacitor 449, although in some embodiments the antenna may be external to the RFID tag. The inductor 447 and the capacitor 449 form an LC circuit, with their inductance and capacitance, respectively, selected such that a resonant frequency of the LC circuit is about the communication frequency of the RFID reader of the peripheral. In some embodiments the capacitor 449 is not used, with instead input capacitance of the RFID integrated circuit providing capacitance of the LC circuit.

In operation, The RFID reader communicates with the RFID tag 443 of the toy. Signals between the reader RFID antenna and the RFID tag may be strengthened by the resonant coupler, improving communications between a reader of the peripheral device and the toy.

Although not depicted in FIG. 4, the peripheral device may include an upper surface for placement of toys thereon, and a cavity for receiving at least portions of those and/or other toys. The reader RFID antenna may be integrated inside the peripheral device, and in some embodiments may be positioned at or about a center of the peripheral device. The cavity for receiving portions of toys, however, may be close to an edge of the peripheral device, sufficiently distant from the reader RFID antenna to potentially result in difficulties when the reader attempts to communicate with the toy. In some embodiments, therefore, the resonant coupler may be integrated into the peripheral device about the location of the cavity, so as to improve communications between the toy and the reader. In some embodiments the resonant coupler may be underneath the cavity, next to the cavity, or have a coil of the inductor of the resonant coupler encompassing the cavity.

Figure 5:
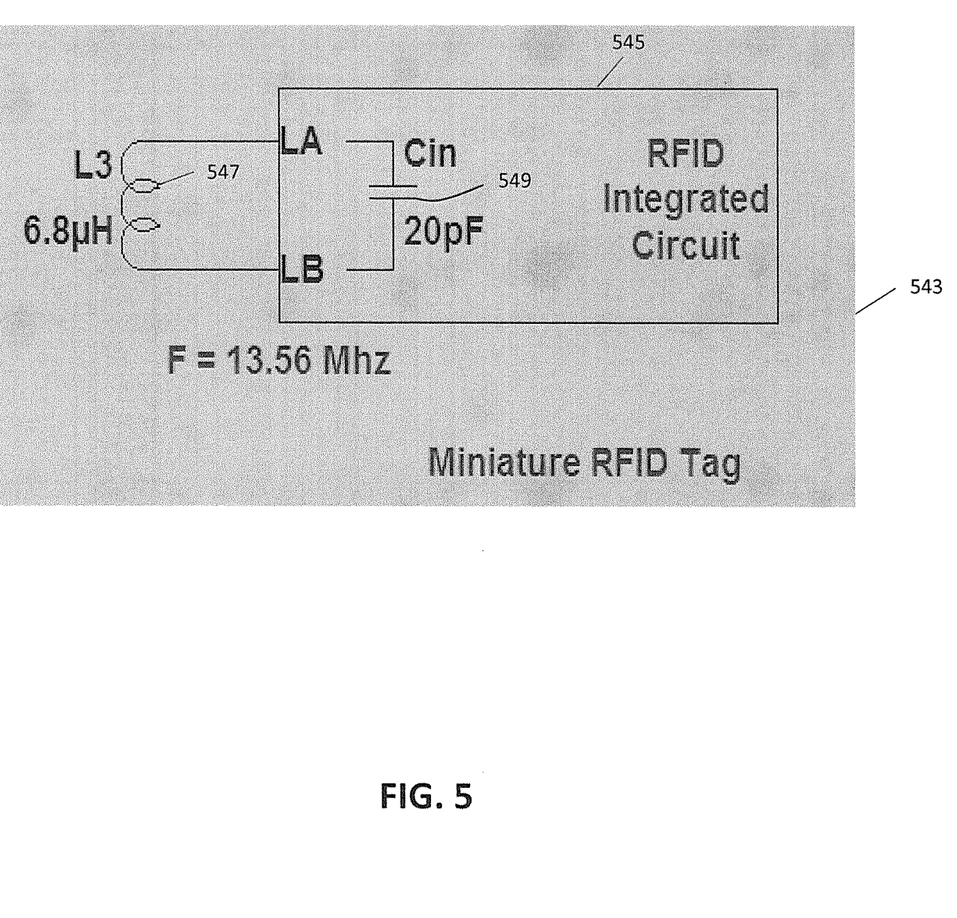
FIG. 5 is a semi-schematic, semi-block diagram of a further RFID tag in accordance with aspects of the invention.

FIG. 5 is a semi-schematic, semi-block diagram of a further RFID tag in accordance with aspects of the invention. The RFID tag, which in the case of FIG. 5 is shown as including an inductive antenna, may in some embodiments be used as the RFID tag of the toy of FIG. 2 or other figures.

In FIG. 5, an inductor 547 is coupled to a radio-frequency identification (RFID) integrated circuit 545. The RFID integrated circuit 545, in some embodiments, is the same as or similar to the RFID integrated circuit of FIG. 4. The RFID integrated circuit 545, for example, may demodulate electrical signals received from inductor 547 and store data reflecting or writable to reflect information of a character or a plurality of characters of a video game, and which may be represented by the toy in some embodiments. In some embodiments, the RFID integrated circuit 545 may modulate electrical signals to transmit information of the character or plurality of characters using inductor 547 to an RFID reader.

The RFID integrated circuit of FIG. 5 is shown as having a capacitance 549 across inputs for the inductor. In some embodiments the capacitance is a capacitor of the RFID integrated circuit. In various embodiments, however, the RFID integrated circuit does not include such a capacitor. Instead, the capacitance is an input parasitic capacitance of the RFID integrated circuit.

The capacitance, in most embodiments, is used in conjunction with inductance of the inductor 547 to tune or control resonant frequency of an LC circuit formed of the inductor and capacitance. For example, in some embodiments the input parasitic capacitance of the RFID integrated circuit is 20 pico-Farads, and an RFID reader is expected to communicate at a frequency of 13.56 MegaHertz. In such circumstances an inductor with an inductance of 6.8 micro-Henrys is utilized to provide an LC circuit with a resonant frequency also of 13.56 Mega-Hertz.

Figure 6:
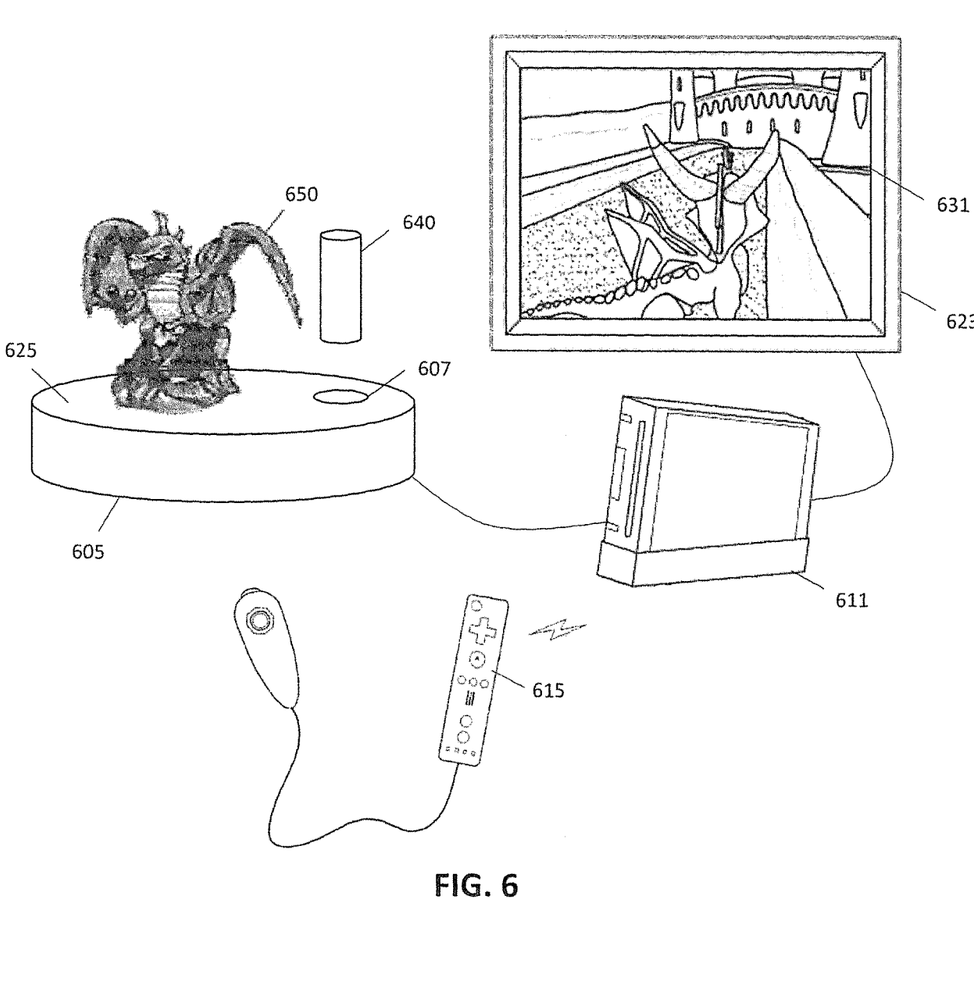
FIG. 6 illustrates a further example of a video game system in accordance with aspects of the invention.

FIG. 6 illustrates a further example of a video game system in accordance with aspects of the invention. The video game system comprises a game console 611 that includes at least one processor for executing program instructions providing for video game play of a video game and associated circuitry, for example, for communicating with input and output devices, user input devices such as a game controller 615, a display device 623 for displaying game play action, a peripheral device 605, a toy 640, and a toy 650.

The game console, game controller, and display device are, in various embodiments, the same as or similar to the game device, game controller, and display device, respectively, of FIG. 2. Similarly, the peripheral 605 may be the same as or similar to the peripheral of FIG. 2, with the peripheral 605 including for example an RFID reader and a resonant coupler. The toys 640 and 650 also include a writeable RFID tag, including an associated antenna, the same as or similar to the toys and/or RFID tags and circuitry discussed with respect to the other figures.

The processor of the game console 611 generally commands game play display on the display device 623 in response from the user input devices (e.g., the game controller 615). In some embodiments, the processor commands game play display of game characters in and interacting with a virtual world of game play and possibly each other. In addition, the processor, in response to inputs from the peripheral device 605, for example inputs based on information read from the toy 640 or the toy 650, commands adding characters and objects to the virtual world, with the characters able to manipulate the added objects and move about the virtual world. For example, the processor may include characters in game play based on inputs from the peripheral device 605, and the processor may control actions and activities of game characters based on inputs from the user input devices (e.g., game controller 615). Furthermore, the processor, in response to inputs from the peripheral device 605, may be used to change the characteristics, powers, and/or attributes of characters and objects in the virtual world. For example, a character in game play may have one or more characteristics, powers, and/or attributes associated with it, such as health, strength, power, speed, wealth, shield, weapons, special abilities, spells, or achievement level, for example. The processor may alter one or more characteristics, powers, and/or attributes associated with a character in response to inputs from the peripheral device 605.

The program instructions providing for game play is generally stored on removable media such as an optical disk. Accordingly, the game console 611 may include an optical drive, for example, a DVD-ROM, CD-ROM or Blu-ray drive, for reading the program instructions for game play. In some embodiments, the removable media may be a flash memory data storage device, a hard disk, or a solid-state disk. In some embodiments, the game console 611 may be a personal computer that includes, for example, a built-in display and built-in user input devices such as a keyboard and a touch pad or mouse. In other embodiments, the program instructions providing for game play may be stored in a remote server that is accessed by a computer or mobile device. In yet other embodiments, the instructions providing for game play may be stored on the local memory of the game console.

The display device 623 is generally coupled to the gaming console 611 by a cable, although in some embodiments a wireless connection may be used. In some embodiments, audio and video contents are transferred from the gaming console 611 to the display device 623 using audio/video interfaces, for example, high-definition multimedia interface (HDMI), component video, and RCA connectors. In many embodiments, the display device 623 is a liquid crystal display (LCD). In some embodiments, the display device is a television. In some embodiments, the display device is a cathode ray display, a plasma display, an electroluminescent display, an LED or OLED display, or other display. A display screen 631 of the display device 623 displays video images of game play, generally as commanded by the processor of the game console 611 or other associated circuitry of the gaming platform. As illustrated in FIG. 6, the display screen 631 shows a screen shot of video game play. The screen shot shows a display of a character, generally controlled by and animated in accordance with user inputs, approaching an inanimate item in the form of what may be considered a castle.

The toy 650 is shown as a fantastical creature, as illustrated generally similar to a dragon, with the fantastical creature atop a substantially flat upper surface 625 of the peripheral. The toy 650 includes a rewritable RFID tag that stores data, for example, reflecting or writable to reflect information of a character in the video game, with for example the character resembling the fantastical creature. In some embodiments, the information of the character is an identification of a character. In some embodiments, information of the character includes information as to the characteristics, for example capabilities, of the character.

The toy 640 is shown in the shape of a cylinder, although in various embodiments the toy 640 may have other shapes. Like the toy 650, the toy 640 includes a rewritable RFID tag that stores data, for example, reflecting or writable to reflect information of a character in the video game. The toy 640 is not atop the substantially flat surface of the peripheral, however. Instead, the toy 640 is proximate a cavity 607 in the upper surface of the peripheral, with the toy 640 and cavity both dimensioned such that the toy may be partially inserted into the cavity.

The RFID tag and antenna are within the toy 640 (and similarly the toy 650). The toy 640 may therefore be considered to be comprised of a housing, providing the external shape of the toy, and an RFID tag and antenna within the housing. In various embodiments the RFID and antenna comprise, and in some embodiments consist of, an RFID integrated circuit and an inductor. In some embodiments the inductor has coils centered about a longitudinal axis of the inductor. In some embodiments the longitudinal axis of the inductor is parallel to a longitudinal axis of the housing of the toy, with in some embodiment there being no offset between the two.

The resonant coupler is positioned proximate to the cavity of the peripheral, in some embodiments below the cavity. Such positioning of the cavity is believed to increase strength of signals passing between the toy 640, while in the cavity, and the RFID reader of the peripheral. Further, in various embodiments the cavity is configured so as to keep the toy 640 in a predefined orientation, at least with respect to one axis of the toy, and in some embodiments the one axis of the toy is an axis defined by a longitudinal axis of the inductor. In some such embodiments the cavity is so configured so as to align magnetic fields generated by the inductor of the antenna of the toy with an inductor of the resonant coupler.

Although the invention has been discussed with respect to various embodiments, it should be recognized that the invention comprises the novel and non-obvious claims supported by this disclosure.

What is claimed is:

1. A video game system, comprising:
   a toy including an inductor connected to a radio frequency identifier (RFID) integrated circuit, the RFID integrated circuit including memory to store information related to a video game character, the inductor and an input capacitance provided by the RFID integrated circuit forming a resonant circuit with a resonant frequency inversely proportional to a square root of inductance of the inductor and capacitance of the input capacitance provided by the RFID integrated circuit;

a peripheral device including RFID reader circuitry and a resonant coupler, the RFID reader circuitry configured to transmit signals at a frequency about the resonant frequency of the resonant circuit of the toy, the resonant coupler having a resonant frequency about the resonant frequency of the resonant circuit of the toy; and a video game device coupled to the peripheral device, the video game device configured to command the peripheral to write the information related to the video game character to the toy, to read the information related to the video game character from the toy, and to provide for video game play in which a user controls the video game character, wherein the peripheral device includes a cavity for receiving at least a portion of the toy, and wherein the resonant coupler is positioned about the cavity of the peripheral.

2. A video game system, comprising:

a toy including an inductor connected to a radio frequency identifier (RFID) integrated circuit, the RFID integrated circuit including memory to store information related to a video game character, the inductor and an input capacitance provided by the RFID integrated circuit forming a resonant circuit with a resonant frequency inversely proportional to a square root of inductance of the inductor and capacitance of the input capacitance provided by the RFID integrated circuit;

a peripheral device including RFID reader circuitry and a resonant coupler, the RFID reader circuitry configured to transmit signals at a frequency about the resonant frequency of the resonant circuit of the toy, the resonant coupler having a resonant frequency about the resonant frequency of the resonant circuit of the toy; and a video game device coupled to the peripheral device, the video game device configured to command the peripheral to write the information related to the video game character to the toy, to read the information related to the video game character from the toy, and to provide for video game play in which a user controls the video game character, wherein the resonant frequency of the resonant frequency of the toy is 13.56 MegaHertz.

3. A video game system, comprising:

a toy including an inductor connected to a radio frequency identifier (RFID) integrated circuit, the RFID integrated circuit including memory to store information related to a video game character, the inductor and an input capacitance provided by the RFID integrated circuit forming a resonant circuit with a resonant frequency inversely proportional to a square root of inductance of the inductor and capacitance of the input capacitance provided by the RFID integrated circuit;

a peripheral device including RFID reader circuitry and a resonant coupler, the RFID reader circuitry configured to transmit signals at a frequency about the resonant frequency of the resonant circuit of the toy, the resonant coupler having a resonant frequency about the resonant frequency of the resonant circuit of the toy; and a video game device coupled to the peripheral device, the video game device configured to command the peripheral to write the information related to the video game character to the toy, to read the information related to the video game character from the toy, and to provide for video game play in which a user controls the video game character, wherein the inductor has an inductance of 6.8 micro-Henrys.

4. A toy for use in a video game system, comprising:

a housing;

a radio frequency identifier (RFID) circuit within the housing, the RFID circuit configured for operation about a desired radio frequency, the RFID circuit including memory for storing information related to a video game character; and an inductive antenna coupled to the RFID circuit, the inductive antenna consisting of an inductor with a ferromagnetic core, the inductor having an inductance such that a circuit formed by the inductor and an input capacitance of the RFID circuit resonates about the desired radio frequency.

5. The toy of claim 4, wherein the ferromagnetic core comprise a ferrite core.

6. The toy of claim 4, wherein the inductive antenna is within the housing.

7. The toy of claim 4, wherein the toy is in the form of a video game character.

8. The toy of claim 4, wherein the housing is dimensioned to at least partially fit in a cavity of a peripheral device including an RFID reader.

* * * * *